United States Patent [19]

Brite

[11] Patent Number: 5,636,471
[45] Date of Patent: Jun. 10, 1997

[54] METHOD OF APPLYING POWDERED INSECTICIDE TO A FLOORED OR CARPETED AREA

[76] Inventor: Alan D. Brite, 210 Miramar Ave., Montecito, Calif. 93108

[21] Appl. No.: 560,379

[22] Filed: Nov. 17, 1995

[51] Int. Cl.⁶ .................................................. A01M 9/00
[52] U.S. Cl. ................................................ 43/132.1
[58] Field of Search ................ 43/132.1, 1; 427/428, 427/429

[56] References Cited

U.S. PATENT DOCUMENTS

| | | | |
|---|---|---|---|
| 1,961,167 | 6/1934 | Riebel, Jr. | 43/124 |
| 2,222,909 | 11/1940 | Lo Cascio | 401/21 |
| 3,172,574 | 3/1965 | Hiler et al. | 222/615 |
| 4,019,662 | 4/1977 | Dana | 222/414 |
| 4,447,930 | 5/1984 | Glenn, III et al. | 15/322 |
| 4,688,959 | 8/1987 | Snedeker et al. | 401/283 |
| 4,699,537 | 10/1987 | Cook, Jr. | 401/131 |
| 4,958,456 | 9/1990 | Chaudoin et al. | 43/124 |
| 5,006,562 | 4/1991 | Steltenkamp | 514/625 |

FOREIGN PATENT DOCUMENTS 2-283229  11/1990  Japan .................................. 43/132.1

OTHER PUBLICATIONS

"Anti-Bug Coating", American Paint & Coatings Journal, Oct. 8, 1984, p. 64.
"DDT Paint", Time, Dec. 25, 1944.
"Extra Mild Winter Means Flea Season Arrives Early this Year," Business Wire, Inc. (Apr. 12, 1992).

Primary Examiner—Jeanne Elpel
Attorney, Agent, or Firm—Lyon & Lyon LLP

[57] ABSTRACT

A method of applying a powdered insecticide directly to carpeting and other flooring includes using an applicator such as, for example, a paint roller, to evenly apply an insecticide powder to the flooring. The powdered insecticide is first deposited in a container. Then the paint roller's powder-attracting surface is first touched against the insecticide and subsequently contacted with the flooring. The paint roller is moved to distribute the insecticide evenly. If the flooring constitutes carpeting, a stiff brush may be used to brush the insecticide into the carpet fibers.

12 Claims, 1 Drawing Sheet

METHOD OF APPLYING POWDERED INSECTICIDE TO A FLOORED OR CARPETED AREA

BACKGROUND OF THE INVENTION

1. Field of the Invention

The instant invention is directed toward a method of applying insecticide and pertains generally to insecticide dispensing devices. More specifically, it relates to methods for applying insecticide to carpeting and other flooring.

2. Background Art

It is well known that a major problem for pet owners is trying to control fleas and ticks on their dogs and cats. In order to effectively control or eliminate these troublesome fleas and ticks, it is necessary to treat not only the pet but also any area occupied by the pet. For example, due to the vibration caused by the pet as it walks, newly hatched fleas may jump from carpeting onto the pet as it passes by.

If one merely treats the pet, pesky insects may avoid the treated pet until the insecticide used to treat the pet loses its effectiveness. After the insecticide degenerates to a tolerable level for the insect, the insect may return to the animal. In addition, as discussed above, insects may lay their eggs in a location other than directly on the pet. Thus, even if the pet owner effectively kills all of the insects actually living on the pet, this may not eliminate the problem. As discussed above, when these eggs hatch, the owner will be forced to re-treat the pet. This cycle could repeat indefinitely unless steps are taken to kill the insects in the pet's environment in addition to the insects living on the pet itself.

It is necessary, therefore, to distribute insecticide directly on the surfaces with which the pet comes into contact. In particular, one should treat all carpeted flooring since insects may live and lay their eggs in the carpeting. Applying powdered insecticide to carpeted surfaces may be, however, a tedious job. It is difficult and time consuming to achieve an even distribution of the insecticide while avoiding waste. Further, when powdered insecticide is shaken onto carpeting, it forms uneven clumps. There is a need, therefore, for a method of applying powdered insecticide that involves rolling the insecticide and thereby avoids uneven clumping by brushing the insecticide into the nap of the carpeting.

SUMMARY OF THE INVENTION

The present invention satisfies this need. This invention comprises a method for applying a powdered insecticide directly to flooring, particularly carpeted flooring. This is accomplished by a unique combination of steps, preferably including the use of a paint roller or other applicator to easily and evenly distribute an appropriate amount of powdered insecticide on an area to be treated. In the case of carpeting, the method may further comprise the step of brushing the insecticide into the carpet fibers using a stiff brush. By using the disclosed method, a pet owner may quickly apply a uniform amount of powdered insecticide to a large surface area.

Accordingly, it is an object of the disclosed invention to provide an improved method for applying powdered insecticides directly to flooring.

A more detailed explanation of the invention is provided in the following description and claims, and is illustrated in the accompanying drawings.

DESCRIPTION OF THE PREFERRED EMBODIMENT

Figures 1, 2, 3, 4:
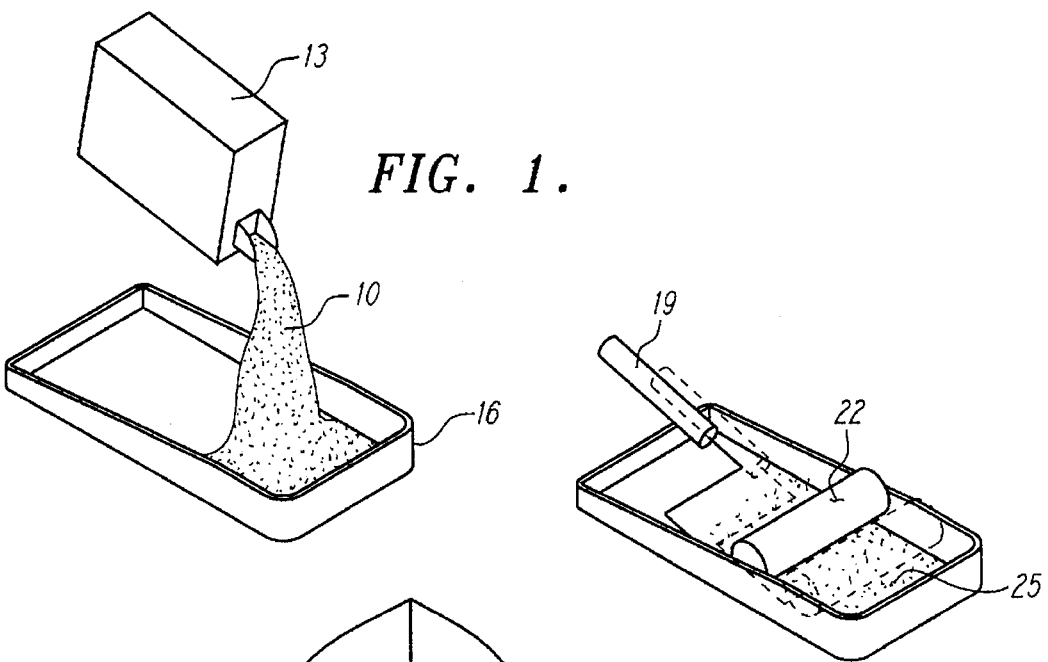
FIG. 1 is a perspective view of a powdered insecticide being poured into a container.
FIG. 2 is a perspective view of an applicator being moved over an exposed surface of the powdered insecticide to pick up a quantity of the insecticide.
FIG. 3 is a perspective view of the applicator in position on an area that has been treated, which is adjacent to an area to be treated.
FIG. 4 is a perspective view of a brush in position on a treated area.

A further understanding of the present invention may be had by reference to the following description taken in connection with the accompanying drawings. Referring to FIG. 1, a powdered insecticide 10 is being poured from a storage receptacle 13 into a container 16. In the preferred embodiment, the container 16 is a paint-roller tray.

FIG. 2 depicts an applicator 19 with its powder-attracting surface 22 in contact with the exposed surface 25 of the powdered insecticide 10. In the preferred embodiment depicted, the applicator 19 is a paint roller, and the powder-attracting surface 22 is the nap of the paint roller 19. After the nap 22 is in contact with the exposed surface 25 of the insecticide 10, the paint roller 19 is moved across the exposed surface 25. This is represented in FIG. 2 by a second, phantom representation of the paint roller 19. Preferably, the person using the method maintains sufficient pressure on the paint roller 19 that the nap 22 rolls across the exposed surface of insecticide 25. In this manner the nap 22 attracts a relatively even quantity of the powdered insecticide 10 on its entire surface for distribution on an area to be treated 28.

FIG. 3 depicts an area to be treated 28 adjacent to an area that has been treated 31. The paint roller 19 is shown over the treated area 31. In the preferred method, the paint roller 19 is placed in contact with the untreated area 28. Then, the paint roller 19 is moved across the untreated area 28 while applying pressure to the roller 19 such that its powder-attracting surface 22 rolls across the untreated area 28. Although the powdered insecticide 10 is dispensed on the surface whenever the nap 22 is in contact with the untreated area 28, applying an amount of pressure that allows the nap 22 to roll across the untreated area 28 is preferable to pushing so hard that the attractive surface 22 skids rather than rolls.

When carpeting (in contrast to a hard surface such as hardwood, linoleum, or tile) constitutes the surface to be treated, it may be desirable to take additional steps after a quantity of the powdered insecticide 10 has been distributed on the surface to be treated 28. For example, it may be desirable to work the insecticide into the carpet fibers. FIG. 4 depicts a brush 34 being used to work the insecticide 10 into the carpeting. As shown in FIG. 4, a quantity of powdered insecticide 10 has been distributed on the treated surface 31. With the brush 34, one may then brush the insecticide into the carpet. This helps ensure that any eggs or insects present below the top surface are exposed to the insecticide, making it difficult for them to survive the insecticide by hiding in the carpet.

While what has been described above is a preferred embodiment of this invention, it will be obvious to those skilled in the art that numerous alterations may be made without departing from the spirit or scope of this invention. It is intended that all matter contained in the above description or shown in the accompanying drawings shall be interpreted as being illustrative only and not limiting. The invention, therefore, is not to be limited except in accordance with the below claims.

I claim:

1. A method of applying a dry powdered insecticide, comprising:

filling, at least partially, a container with the insecticide;

positioning a paint roller with a powder-attracting surface where at least a portion of the powder-attracting surface contacts an exposed surface of the insecticide in the container;

placing the powder-attracting surface in contact with an area to be treated; and distributing, at least partially, the insecticide from the powder-attracting surface on the area.

2. The method of claim 1 wherein the container comprises a paint roller tray.

3. The method of claim 2 wherein the powder-attracting surface comprises a nap of the paint roller.

4. The method of claim 3 wherein the positioning step further comprises the step of rolling the paint roller across the exposed surface of the insecticide while the nap contacts the exposed surface.

5. A method of applying a powdered insecticide, comprising:

filling, at least partially, a container with the insecticide;

positioning a paint roller with a powder-attracting surface where at least a portion of the powder-attracting surface contacts an exposed surface of the insecticide in the container;

placing the powder-attracting surface in contact with a carpeted floor; and distributing, at least partially, the insecticide from the powder-attracting surface on the carpeted floor.

6. The method of claim 5 wherein the step of distributing comprises rolling the paint roller across the carpeted floor and brushing the powdered insecticide into the carpeting with a brush.

7. The method of claim 6 wherein the container comprises a paint roller tray, and the powder-attracting surface comprises a nap of the paint roller.

8. A method of applying a dry powdered insecticide, comprising the sequential steps of:

filling, at least partially, a paint roller tray with the insecticide;

positioning a paint roller with its nap at least partially in contact with an exposed surface of the insecticide in the paint roller tray;

rolling the nap across the exposed surface until the nap retains a quantity of the insecticide;

placing the paint roller in contact with a surface to be treated; and moving the paint roller across the surface to be treated.

9. The method of claim 8 wherein the step of moving the paint roller across the surface to be treated comprises applying pressure to the paint roller until the nap rolls across the surface to be treated.

10. The method of claim 8 wherein the surface to be treated is a material selected from the group consisting of hardwood, linoleum, and tile.

11. A method of applying a powdered insecticide, comprising:

filling, at least partially, a paint roller tray with the insecticides;

positioning a paint roller with its nap at least partially in contact with an exposed surface of the insecticide in the paint roller tray;

rolling the nap across the exposed surface until the nap retains a quantity of the insecticide;

placing the paint roller in contact with carpeting; and moving the paint roller across the carpeting.

12. The method of claim 11 wherein the step of moving the paint roller is performed by brushing the powdered insecticide into the carpeting.

* * * * *